(12) United States Patent  
Laub (10) Patent No.: US 9,975,261 B2
(45) Date of Patent: May 22, 2018

(54) CULINARY TOOL FOR CUTTING AND TRANSPORTING FOOD

(76) Inventor: Mauricio Laub, Atlanta, GA (US)

( * ) Notice: Subject to any disclaimer, the term of this patent is extended or adjusted under 35 U.S.C. 154(b) by 2877 days.

(21) Appl. No.: 12/139,075

(22) Filed: Jun. 13, 2008

(65) Prior Publication Data

US 2008/0307655 A1 Dec. 18, 2008

Related U.S. Application Data

(60) Provisional application No. 60/934,492, filed on Jun. 14, 2007.

(51) Int. Cl.
*B26B 1/00* (2006.01)
*B26B 11/00* (2006.01)
*A47G 21/04* (2006.01)
*A47J 43/28* (2006.01)

(52) U.S. Cl.
CPC .......... *B26B 11/006* (2013.01); *A47G 21/045* (2013.01); *A47J 43/288* (2013.01)

(58) Field of Classification Search
CPC ..... B26B 11/006; A47G 21/045; A47J 43/288
USPC ...... 30/122, 123, 136, 136.5, 142, 148, 149, 30/167, 167.1, 167.2, 169–172, 286, 30/308.1; 7/163; 294/7, 8; D7/643, 649, D7/650, 688, 689, 692
See application file for complete search history.

(56) References Cited

U.S. PATENT DOCUMENTS

| | | | | |
|---|---|---|---|---|
| 164,880 A | * | 6/1875 | Shelton | ............................ 30/314 |
| 338,449 A | | 3/1886 | Teller | |
| D27,034 S | * | 5/1897 | Woods | ............................ D7/649 |
| D27,254 S | * | 6/1897 | Barden et al. | ................. D7/649 |
| D28,186 S | * | 1/1898 | Barden | ......................... D7/650 |
| D43,124 S | * | 10/1912 | Nelson et al. | ................. D32/74 |
| D49,368 S | * | 7/1916 | Osterbauer | ..................... D7/691 |
| 2,814,870 A | | 12/1957 | Treiber | |
| 2,938,267 A | * | 5/1960 | Tupper | ............................ 30/142 |
| D255,637 S | * | 7/1980 | Kelly | ............................. D7/688 |
| 4,423,551 A | * | 1/1984 | Chmela et al. | ................. 30/142 |
| D275,065 S | | 8/1984 | Steiner | |
| 5,175,933 A | | 1/1993 | Shepherd | |
| D345,087 S | | 3/1994 | Adams | |
| D376,514 S | * | 12/1996 | Torkelson | ..................... D7/643 |
| D411,080 S | | 6/1999 | Santini | |
| D418,723 S | * | 1/2000 | Bowman | ........................ D7/688 |

(Continued)

OTHER PUBLICATIONS

Miracle Blade III, "Miracle Blade III Knives", http://www.everythingkitchens.com.

*Primary Examiner* — Andrea Wellington
*Assistant Examiner* — Samuel A Davies
(74) *Attorney, Agent, or Firm* — Philip H. Burrus, IV (57) ABSTRACT

A culinary tool (100) suitable for both cutting and transporting food includes a tool member (101) and a handle (108). The tool member (101) begins at an asymmetrical base region (102) and tapers along a major face (103) of the tool member (101) to a distal tip (104). A curvilinear medial ridge (105) begins at the asymmetrical base region (102) and passes along the major face (103), thereby defining a cutting portion (106) and a spatula portion (107). The cutting portion (106) sometimes the distal tip and occupies less of the major face (103) by area than does the spatula portion (107). The handle (108) is affixed to the tool member (101) along the asymmetrical base region (102). The culinary tool (100) can be used in either a cutting mode or a spatula mode.

19 Claims, 4 Drawing Sheets

(56) References Cited

U.S. PATENT DOCUMENTS

| | | | |
|---|---|---|---|
| 6,247,736 B1* | 6/2001 | Esterson et al. | 294/7 |
| 6,490,796 B1* | 12/2002 | Armienta | 30/142 |
| 6,564,685 B1* | 5/2003 | Beaton | 83/609 |
| 7,269,867 B2* | 9/2007 | Karlstedt | 7/105 |
| 2003/0034662 A1 | 2/2003 | Wilson | |
| 2006/0244275 A1 | 11/2006 | Bases | |

* cited by examiner

CULINARY TOOL FOR CUTTING AND TRANSPORTING FOOD

CROSS REFERENCE TO PRIOR APPLICATIONS

This application claims priority and benefit under 35 U.S.C. § 119(e) from U.S. Provisional Application No. 60/934,492, filed Jun. 14, 2007, which is incorporated by reference for all purposes.

BACKGROUND

Technical Field

This invention relates generally to a culinary tool for cutting and transporting food, and more particularly to a utensil having a cutting portion and a spatula portion, such that food can be cut and transported with a single tool.

Background Art

Cooks generally prepare food for cooking with a knife on a cutting board. Whether julienning basil or dicing tomatoes, the cook or chef generally uses a chef's knife or other bladed instrument to cut food into the appropriate size. Once the food has been cut, the food must then be transported from the cutting board to a pan or other vessel for cooking. While the act of transporting food can be accomplished with one's hands, this method is generally messy as small pieces of food are easily dropped.

The chef may elect to transport food with another utensil, such as a board scraper or spatula. This method of using a second device is less than perfect, however, as it requires the use of another tool that must later be washed. Further, efficiency is compromised by switching from one tool to another.

Another method of transporting the food is to use the knife itself. By sliding the edge under the food and towards the other hand, some chefs move food from one location to another using the knife blade as a transport platform. However, this method also has problems. First, sliding an edged surface towards a cupped hand can result in cuts. Second, the knife-edge may become dulled. Third, most knives are not sufficiently wide as to accommodate sufficient amounts of food in transport.

U.S. Pat. No. 338,449, entitled "Kitchen Utensil," issued Mar. 23, 1886, to Ida Teller teaches a kitchen utensil having a uniformly thick blade of steel that is thin enough to chop potatoes or other vegetables, yet wide enough to flip fish, eggs, or omelets. However, this prior art utensil suffers from some of the same issues as those previously discussed. First, to be suitable for chopping potatoes, the uniformly thick blade may result in accidental cuts when food objects are loaded thereupon. Second, the '449 utensil must be carefully held in a horizontal position when carrying food, else the food be dropped. Third, when holding the handle of the '449 utensil close to the blade when chopping, as many cooks do, the chopping hand may find the uniformly thin—yet capable of cutting—blade to be uncomfortable.

There is thus a need for an improved apparatus suitable for both cutting and transporting food.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Reference designators shown herein in parenthesis indicate components shown in a figure other than the one in discussion. For example, talking about a device (10) while discussing figure A would refer to an element, 10, shown in figure other than figure A. It is expected that one of ordinary skill, notwithstanding possibly significant effort and many design choices motivated by, for example, available time, current technology, and economic considerations, when guided by the concepts and principles disclosed herein will be readily capable making and using embodiments of the invention with minimal experimentation.

Embodiments of the invention provide a single culinary tool that can be used as both a knife for cutting food and a scraper or spatula for transporting food. In one embodiment, the culinary tool includes a cutting portion and a spatula portion. A curvilinear medial ridge, which passes along one or both major faces of the tool, separates the cutting portion and spatula portion.

The curvilinear medial ridge, which forms the thickest portion of the tool when viewed in cross section (excluding the handle portion of some embodiments), serves several functions. First, it surrounds the spatula portion, thereby providing a backstop for food when food is loaded upon the tool. Second, it delineates a finger region or portion that a user may grasp when either cutting or transporting food, thereby aiding in user comfort. Third, it provides a stabilizing force across the tool when the tool is flexed or torqued. Additionally, it provides the major faces of the tool with an aesthetically pleasing appearance.

The cutting portion terminates at a sharpened edge and includes a distal tip. The cutting portion can be smooth or serrated, and may be honed in flat ground fashion, hollow ground fashion, double or compound bevel fashion, convex ground fashion, or chisel ground fashion. It may further include scalloped recesses for reducing friction when slicing through food.

Figure 1:
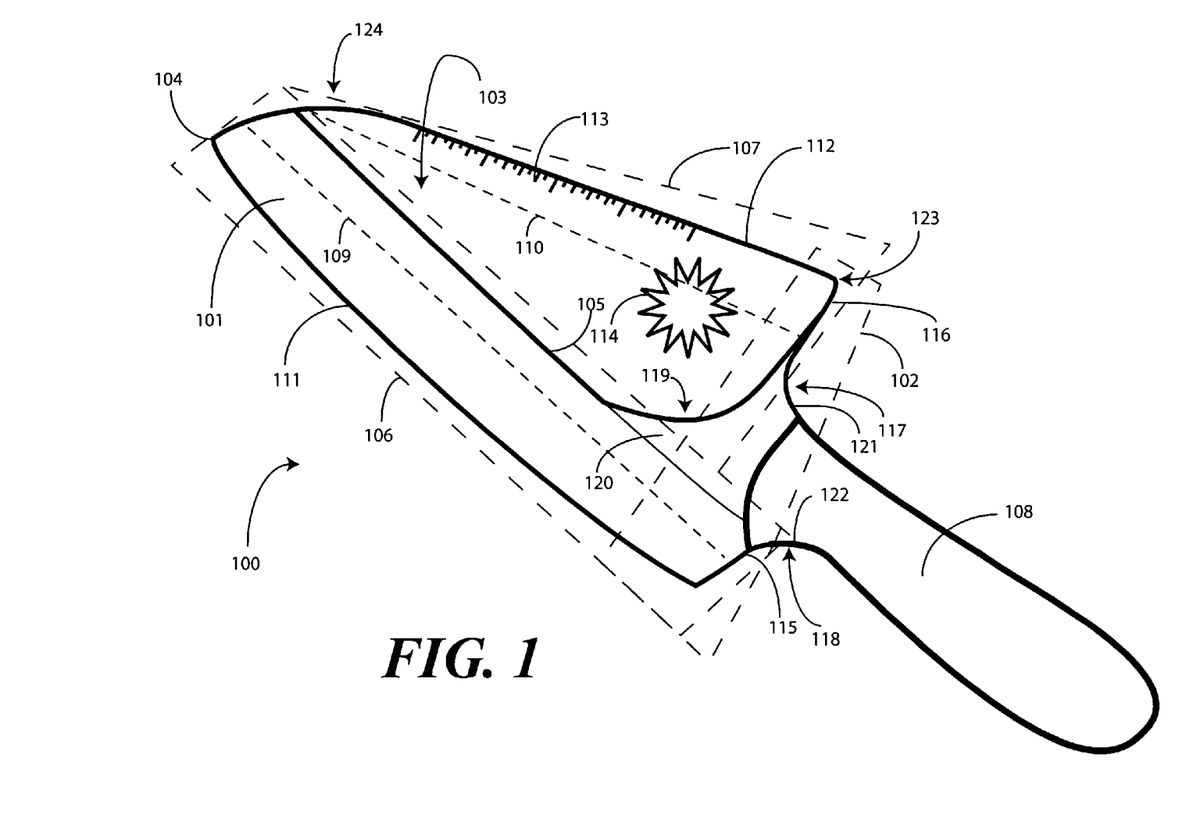
FIG. 1 illustrates one embodiment of a culinary tool suitable for cutting and transporting food in accordance with the invention.

Turning now to FIG. 1, illustrated therein is one embodiment of a culinary tool 100 suitable for both cutting and transporting food in accordance with the invention. The culinary tool 100 includes a tool member 101 and a handle 108. The handle 108 is affixed to the tool member 101.

The tool member 101 can be manufactured from a variety of materials, including carbon steel, Damascus steel, stainless steel, carbon steel, laminated metal, titanium, or plastic. When manufactured from metal, the tool member 101 can be hot forged, drop hot forged, or stamped. The handle 108 can be manufactured from a variety of materials as well, including plastic, composites, resins, epoxies, metals, rubber, mircata, wood, or bone. The handle 108 and the tool member 101 may be manufactured from the same or different materials. For example, the tool member 101 may be manufactured from metal, while the handle 108 may be manufactured from bone or plastic. Alternatively, the tool member 101 and handle 108 may both be manufactured from stainless steel.

The tool member 101 begins at an asymmetrical base region 102 and extends to a distal tip 104. The asymmetrical base region 102, in one embodiment, includes a cutting portion base 115 and a spatula portion base 116. The handle 108, in one embodiment, is coupled to the tool member 101 between the cutting portion base 115 and the spatula portion base 116.

The asymmetrical base region 102 is asymmetrical, in many embodiments, because the shape, placement, and length of the cutting portion base 115 is different from that of the spatula portion base 116. Additionally, the angles at which the cutting portion base 115 and the spatula portion base 116 extend from the handle 108 can be different as well. Further, as shown in FIG. 1, the distance (roughly length 109) between the distal tip 104 and the cutting portion base 115 can be different from the distance (roughly length 110) between the distal tip 104 and the spatula portion base 116.

By way of example, in FIG. 1, the distance (roughly length 109) between the distal tip 104 and the cutting portion base 115 is longer than the distance (roughly length 110) between the distal tip 104 and the spatula portion base 116. Such a configuration permits the spatula portion base 116 to include a concave curvature 117 running from the handle 108 to the spatula portion base 116. This concave curvature 117 is suitable for accepting the web of a user's hand when the culinary tool 100 is being used in a cutting mode.

Similarly, a second concave curvature 118 can be included between the handle 108 and the cutting portion base 115. This second concave curvature 118, shown illustratively in FIG. 1 as being shallower and less concave than concave curvature 117, is suitable for a user's fingers when the culinary tool 100 is used in a cutting mode. When the culinary tool 100 is turned over, the second concave curvature 118 can receive the web of the users hand when the culinary tool 100 is being used in the spatula mode.

A curvilinear medial ridge 105 passes from the asymmetrical base region 102 across the tool member 101. The curvilinear medial ridge 105 is formed by a thicker portion of the material—when viewed in cross section—comprising the tool member 101. The curvilinear medial ridge 105 defines the cutting portion 106 and the spatula portion 107. The cutting portion 106, which includes the distal tip 104 in one embodiment, is disposed along one side of the curvilinear medial ridge 105. The spatula portion 107 is disposed along the other side of the curvilinear medial ridge 105.

As can be seen in FIG. 1, the cutting portion 106 and the spatula portion are different shapes and comprise differing amounts of the major face 103, by area, of the tool member 101. For instance, the cutting portion 106 in one embodiment is substantially rectangular, while the spatula portion 107 is substantially triangular. The cutting portion 106 has a length—roughly represented by length 109—that is—in one embodiment—longer than the length (represented by length 110) of the spatula portion 107.

As one of the primary functions of the culinary tool 100 is to transport food, in one embodiment the spatula portion 107 consumes a larger area of the major face 103 than does the cutting portion 106. For example, in one embodiment the spatula portion 107 comprises at least forty percent of the major face 103, while the cutting portion 106 consumes at least thirty percent of the major face 103. In another embodiment, the spatula portion 107 comprises at least fifty percent of the major face 103, while the cutting portion 106 comprises at least forty percent of the major face.

To further assist in the transportation of food, the curvilinear medial ridge 105 surrounds the spatula portion 107 and forms a backstop of sorts to prevent food from sliding off the tool member 101 or into the cutting portion 106. In one embodiment, the curvilinear medial ridge 105 begins at the spatula portion base 116 of the asymmetrical base region 102 and curves towards the interior of the tool member 101, thereby creating a backstop pocket 119 in the spatula portion 107. This backstop pocket 119 is suitable for collecting food for transport. The backstop pocket 119 permits small movements of the culinary tool 100 without the spillage of food collected atop the spatula portion 107.

In one embodiment, the curvilinear medial ridge 105 also defines a finger portion 120 that can be grasped by a user. The finger portion 120 is a region of substantially flat metal existing between the curvilinear medial ridge 105 and the cutting portion 106. A user, when employing the sharpened edge 111 of the cutting portion 106 to cut food, may place the web of the hand into the concave curvature 117 and then grasp the finger portion 120 with the thumb and forefinger for added control. Alternatively, the user may grasp the finger portion 120 with a knuckle of the thumb and a knuckle of the forefinger.

The handle 108 can protrude across the tool member 101 in varying degrees. As shown in FIG. 1, the handle 108 can slightly protrude into the tool member 101 in the cutting portion 106, and may take on its own unique shape as it passes across the tool member 101. In another embodiment, the handle 108 may protrude far enough into the interior of the tool member 101 as to mate with the curvilinear medial ridge 105. In other embodiments, the handle 108 may terminate at the edge of the tool member. The choice will depend upon the application and desired performance.

For example, in one embodiment, the handle 108 may extend somewhat into the finger portion 120. This configuration can provide the user with a wider surface to grasp within the finger region 120. In such a configuration, as well as in other configurations, the handle 108 may include a bolster at location 121 that runs in a curvilinear fashion from the handle 108 to or along the spatula portion base 116. The bolster at location 121 may take other shapes as well.

Similarly, to provide additional comfort or stability when the culinary tool 100 is turned over, an opposite bolster can be included at location 122. Said differently, the handle 108 can include another bolster at location 122 that runs from the handle 108 to or along the cutting portion base 115.

The bolsters at locations 121,122 may operate as finger guards. The finger guards, known to those of ordinary skill in the art, can be employed to help keep fingers away in a comfortable position. Alternatively, the bolsters at locations 121,122 may be added to facilitate a different aesthetic appearance.

Figure 2:
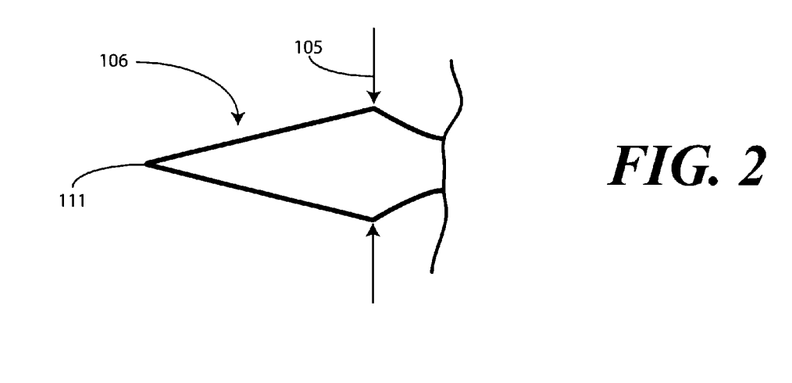
FIG. 2 illustrates a sectional view of one embodiment of a cutting portion of a culinary tool in accordance with embodiments of the invention.
Figure 4:
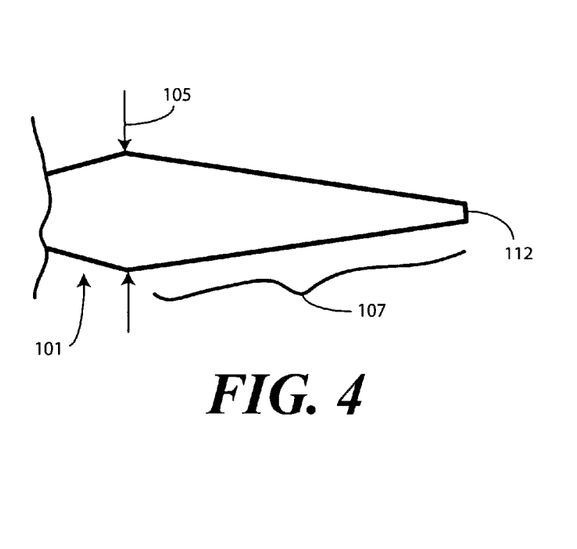
FIG. 4 illustrates a sectional view of one embodiment of a spatula portion of a culinary tool in accordance with embodiments of the invention.
Figure 5:
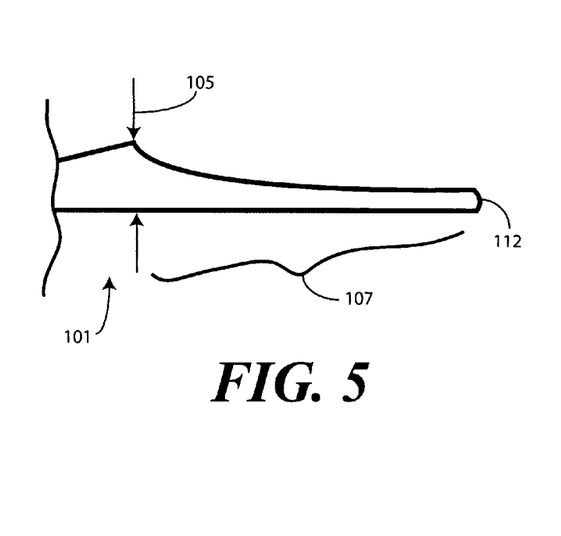
FIG. 5 illustrates another sectional view of one embodiment of a spatula portion of a culinary tool in accordance with embodiments of the invention.

The cutting portion 106 begins at the curvilinear medial ridge 105 and ends at a sharpened edge 111. Turning briefly to FIG. 2, illustrated therein is one embodiment of a sectional view of the cutting portion 106. In the embodiment of FIG. 2, the cutting portion 106 is at its thickest at the curvilinear medial ridge 105. Note that while the embodiment of FIG. 2 includes the curvilinear medial ridge 105 on both sides of the tool so as to be ambidexterous, some embodiments of the invention have the curvilinear medial ridge 105 only on one side. (FIG. 5 illustrates a tool having the curvilinear medial ridge on one side, while FIG. 4 illustrates a tool having the curvilinear medial ridge on two sides.) Such embodiments allow the tool to be held closer to a cutting board when the tool is being used in the spatula mode.

In FIG. 2, the cutting portion 106 tapers from the curvilinear medial ridge 105 to the sharpened edge 111 in a linear fashion. It will be clear to those of ordinary skill in the art having the benefit of this disclosure that the invention is not so limited. For example, the cutting portion 106 can taper to the sharpened edge 111 in a curvilinear fashion as well.

Figure 7:
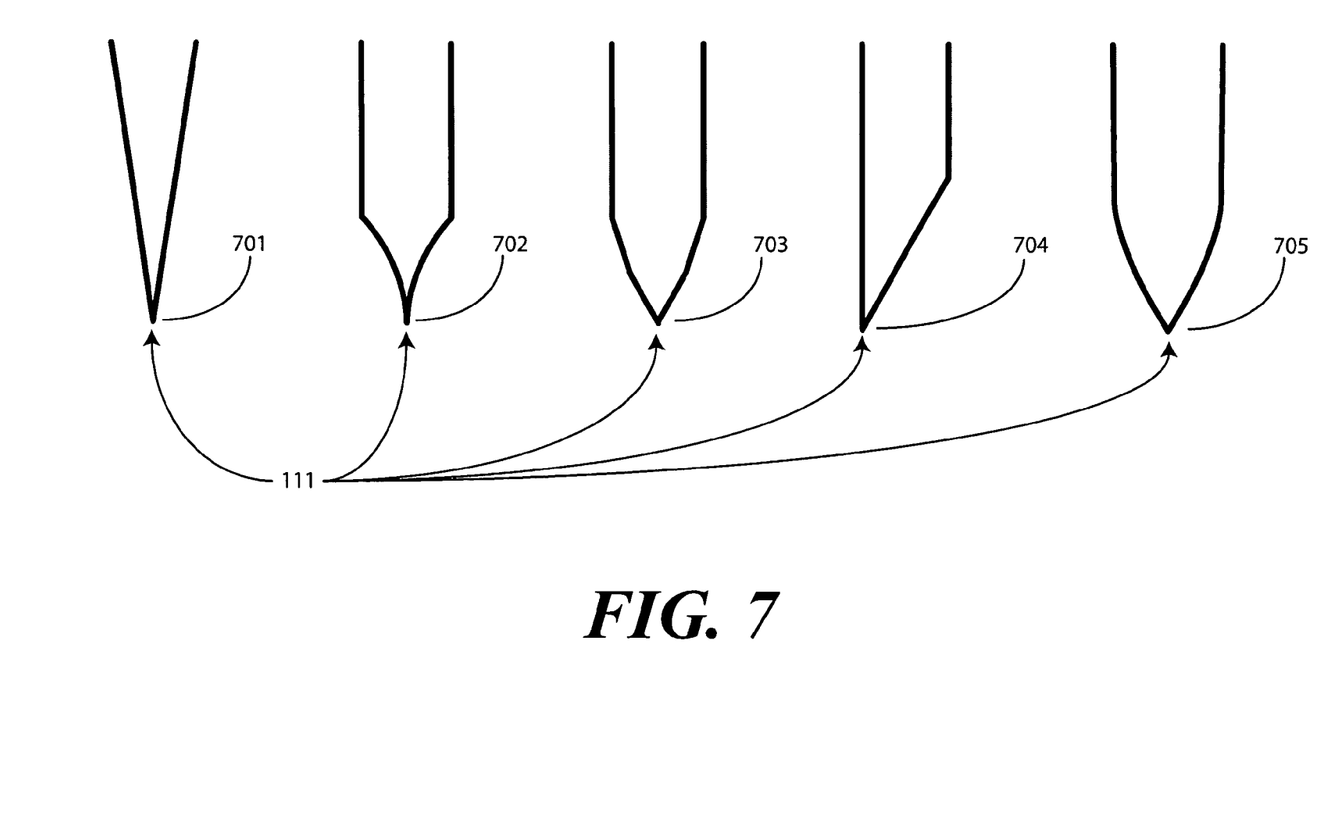
FIG. 7 illustrates several embodiments of edges suitable for use with culinary tools in accordance with embodiments of the invention.

To further illustrate this point, turning now briefly to FIG. 7, illustrated therein are various embodiments of the sharpened edge 111 that may be employed in accordance with the present invention. The embodiments of FIG. 7 are meant to be illustrative only, and are not intended to be limiting.

The sharpened edge 111 may take many different shapes, depending upon the design of the culinary tool (100) and its intended use. For example, in one embodiment the sharpened edge 111 takes on a flat ground shape 701. In another embodiment, the sharpened edge 111 takes on a hollow ground shape 702. In another embodiment, the sharpened edge 111 takes on a double or compound bevel 703. In another embodiment, the sharpened edge 111 takes on a chisel ground shape 704. In yet another embodiment, the sharpened edge takes on a convex ground shape 705.

Turning now back to FIG. 1, just as the cutting portion 106 gets narrower from curvilinear medial ridge 105 to sharpened edge 111 (when viewed in cross section), in one embodiment so does the spatula portion 107. In the embodiment of FIG. 1, the spatula portion 107 tapers from the curvilinear medial ridge 105 to a blunt edge 112. A blunt edge 112 is used on the spatula portion 107 so that a user will not be injured when using a hand to load food onto the spatula portion 107.

As noted above, one advantage of the curvilinear medial ridge 105 is that it serves a stop for food when it is loaded onto the spatula portion 107. To accomplish this, the thickness of the curvilinear medial ridge 105 is thicker—when viewed in cross section—that is the blunt edge 112. Turning briefly to FIGS. 4 and 5, illustrated therein are two different embodiments of the tool member 101 and spatula portion 107.

In FIG. 4, the spatula portion 107 tapers from the curvilinear medial ridge 105 to the blunt edge 112 along the cross section of the tool member 101 in a linear fashion. FIG. 4 also illustrates the curvilinear medial ridge 105 existing on both sides of the tool member 101.

In FIG. 5, the spatula portion 107 tapers from the curvilinear medial ridge 105 to the blunt edge 112 along the cross section of the tool member 101 in a concave, non-linear fashion. In FIG. 5, the curvilinear medial ridge 105 is disposed only on one side of the tool member 101.

In both FIGS. 4 and 5, the curvilinear medial ridge 105 is thicker than is the blunt edge. For example, in one embodiment, the blunt edge 112 has a thickness of between ten-thousandths and eighty thousandths of an inch. The curvilinear medial ridge 105 has a thickness of between forty thousandths and sixty thousandths of an inch. Experimental testing has shown these ranges to work well for holding food on the spatula portion 107 when using the culinary tool (100) in the spatula mode. For instance, in on embodiment the blunt edge 112 is approximately thirty-five thousandths of an inch, while the curvilinear medial ridge 105 is approximately sixty thousandths of an inch.

Note that the blunt edge 112 is shown in FIG. 4 is substantially rectangular in cross section. In FIG. 5, it is convex in cross section. These geometrical configurations are illustrative only. It will be clear to those of ordinary skill in the art having the benefit of this disclosure that the invention is not so limited. The blunt edge 112 can be tapered, slanted, or have another shape. However, in each case, the blunt edge 112 is kept dull enough so as not to injure the user during reasonable, normal use.

Turning now back to FIG. 1, the overall length of the culinary tool 100 can vary. For example, the culinary tool 100 can be configured as a paring knife, wherein the tool member has a length of around three inches. Similarly, the culinary tool 100 can be configured as a chef's knife measuring fifteen inches or more. Other configurations having lengths between can be configured as well. Just as the overall culinary tool 100 can have differing lengths, so too will the curvilinear medial ridge 105. For instance, the curvilinear medial ridge 105 can measure—for typical applications—between three and fifteen inches in length.

Regardless of the length of the overall culinary tool 100, it is generally the case that the spatula portion 107 will occupy more of the major face 103 by area than will the cutting portion 106. Often, the spatula portion 107 will be around twice the size of the cutting portion 106. Said differently, in some embodiments the spatula portion 107 will consume about two-thirds of the major face 103 by area, while the cutting portion 106 will consume about one-third of the major face 103 by area.

The spatula portion base 116 meets the blunt edge 112 at an angle 123. To present suitable spatula surface area, in some embodiments this angle 123 is quite wide. For instance, experimental testing has shown angles of between fifty and ninety degrees are suitable for angle 123.

In the embodiment of FIG. 1, the spatula portion 107 tapers from the spatula portion base 116 towards the distal tip 104. The spatula portion 107 in this embodiment also includes a convex curvature portion 124 that is located distally from angle 123. The convex curvature portion 124 is disposed opposite the blunt edge 112 from the angle 123 defined by the spatula portion base 116 and the blunt edge 112. The convex curvature portion 124 provides the spatula portion 107 with the generally triangular shape shown in FIG. 1. It will be clear to those of ordinary skill in the art having the benefit of this disclosure, however, that the overall tool member 101, and thus the spatula portion 107, can take different shapes.

Figure 3:
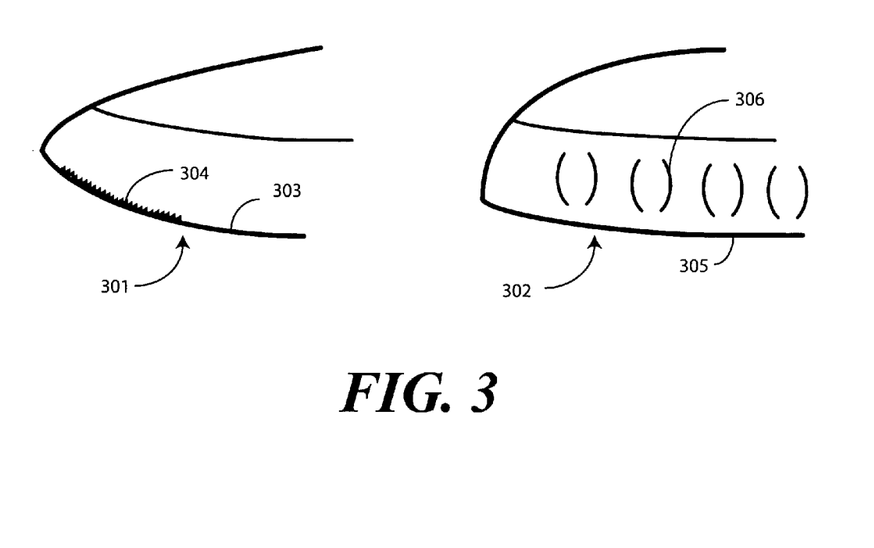
FIG. 3 illustrates various combinations of embodiments of sharpened edges and distal tips suitable for use with a culinary tool in accordance with embodiments of the invention.

Turning now to FIG. 3, illustrated therein are varying shapes that the distal portion of the tool member (101) may take. These shapes are illustrative only. For example, tool member 301 includes the convex curvature shown in FIG. 1 and therefore takes on a chef's knife shape. Tool member 302 has a radical convex curvature and thus takes on a Santoku shape. Other distal end configurations will be obvious to those of ordinary skill in the art having the benefit of this disclosure. By way of example, the tool member 301 may have a rectangular end, thereby taking the shape of a cleaver.

Also, just as the distal end can have different shapes, the sharpened edge (111) may also take on different configurations. For instance, the sharpened edge 303 of tool member 301 is a includes serrations 304. Alternatively, this sharpened edge may be smooth. The sharpened edge 305 of tool member 302 includes scalloped regions 306 that reduce friction when the culinary tool (100) is being used in the cutting mode. The various distal end configurations and sharpened edge configurations can be used in any combination.

Turning now back to FIG. 1, in some embodiments, the tool member 101 will include a coating or surface treatment disposed thereon, or integrated therewith. For instance, in one embodiment, the tool member 101 may be coated with a non-stick surface so as to impair any adhesion between food and the tool member 101.

Other features can be added to the tool member 101 as well. For example, the tool member 101 can include demarcations 113 disposed along the blunt edge 112. The optional demarcations 113 can be in the form of a ruler such that the user may use the demarcations for measuring length. The demarcations 113 may be etched into the tool member 101. Alternatively, they may be printed on the tool member 101 or applied by vapor deposition or other equivalent process.

In one embodiment, the tool member 101 comprises graphical indicia 114. In the illustrative embodiment of FIG. 1, the optional graphical indicia 114 are disposed along the spatula portion 107. In other embodiments, the graphical indicia 114 are disposed along the cutting portion 106. Combinations of the cutting portion 106 and the spatula portion 107 may also contain graphical indicia. The graphical indicia 114 may be a logo of a manufacturer. Alternatively, the graphical indicia 114 may be promotional material, instructional material, recipes, measurement conversions, or other information. Further, any of the cutting portion 106, the spatula portion 107, or combinations thereof may be painted, treated, or otherwise coated as to exhibit a color, such as black, red, or pink.

Figure 6:
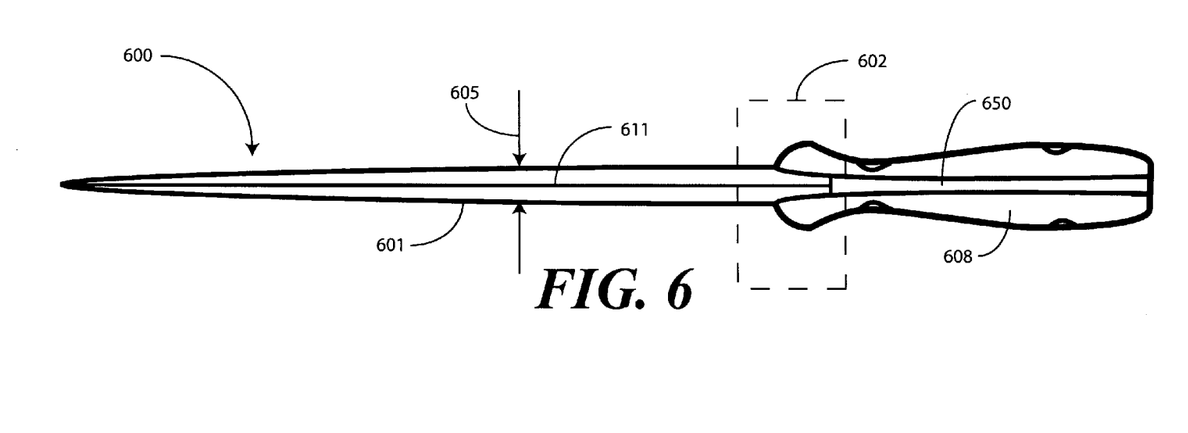
FIG. 6 illustrates a side, elevation view of one embodiment of a culinary tool suitable for cutting and transporting food in accordance with embodiments of the invention.

Turning now to FIG. 6, illustrated therein is one embodiment of a culinary tool 600 in accordance with embodiments of the invention. The culinary tool 600 of FIG. 6 is shown in an elevation, side view such that the handle 608 and its connection to the tool member can be more readily seen. The handle 608 can be coupled to the tool member 601 in a variety of ways, including glues, epoxies, rivets, screws, or other fastening devices. Alternatively, the handle 608—where manufactured from plastic for instance—can be insert molded about the tool member 601.

In one embodiment, the tool member 601 includes a tang 650 that extends distally away from the asymmetrical base region 602 through the handle 608. This tang 650 can be in a full tang configuration, as shown in FIG. 6, as the tang 650 passes all the way through the handle 608. Alternatively, the tang 650 can be in a partial tang configuration, where the tang 650 passes only partially through the handle 608.

The thickness of the curvilinear medial ridge 605, relative to the sharpened edge 611, can also be seen in FIG. 6. Note that the curvilinear ridge 605 in this embodiment is disposed along both major faces of the tool member 601. As noted above, the sectional thickness of the curvilinear medial ridge 605 is thicker than that of the sharpened edge 611.

Turning now back to FIG. 1, various modes of using the culinary tool 100 will be explained. When the culinary tool 100 is used in the cutting mode, the user places their hand such that the web of the hand meets with the concave curvature 117. The user then either wraps the fingers about the handle 108, or grasps the finger portion 120 with the thumb and forefinger. The user then holds the culinary tool 100 such that the tool member is generally in a vertical position. The user then uses the sharpened edge 111 to cut or slice food.

When the culinary tool 100 is used in the spatula mode, the user turns the culinary tool to a more substantially horizontal position. The hand grasping the handle 108 can remain in the same position (as the cutting mode) by supinating the wrist. Alternatively, the user may pivot the hand about the handle 108 such that the tool member 101 can be held in a more horizontal position.

With the tool member 101 in this position, the blunt edge 112 can be slid under food. The user may desire to assist the food on to the spatula portion 107 with the free hand. The user has no worries of being cut, as the blunt edge 112 is just that—blunt. As the food slides onto the spatula portion 107, it meets higher resistance when contacting the curvilinear medial ridge 105. The curvilinear medial ridge 105 thus acts as a stop, preventing food from both falling off and from sliding over to the cutting portion 106. The user may then simply transport the culinary tool 100 and the food to its appropriate destination.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A culinary tool suitable for both cutting and transporting food, the culinary tool comprising:
    a tool member beginning at an asymmetrical base region and tapering along a major face to a distal tip, the tool member comprising a curvilinear medial ridge passing from the asymmetrical base region across the tool member thereby defining a cutting portion that includes the distal tip and is disposed along one side of the curvilinear medial ridge, and a spatula portion disposed along an opposite side of the curvilinear medial ridge; and a handle affixed to the asymmetrical base region;

wherein the cutting portion comprises at least thirty percent of the major face by area, and wherein the spatula portion, surrounded along an interior of the tool member by the curvilinear medial ridge, comprises at least forty percent of the major face by area.

2. The culinary tool of claim 1, wherein the cutting portion has a cutting portion length and the spatula portion has a spatula portion length, wherein the cutting portion length is greater than the spatula portion length.

3. The culinary tool of claim 2, wherein the spatula portion comprises a blunt edge, wherein the spatula portion tapers from the curvilinear medial ridge to the blunt edge along a cross section of the tool member in a linear fashion.

4. The culinary tool of claim 2, wherein the spatula portion comprises a blunt edge, wherein the spatula portion tapers from the curvilinear medial ridge to the blunt edge along a cross section of the tool member in a concave, non-linear fashion.

5. The culinary tool of claim 4, wherein the blunt edge has a thickness of between ten-thousandths and eighty-thousandths of an inch.

6. The culinary tool of claim 4, wherein the blunt edge comprises demarcations disposed along the blunt edge for measuring length.

7. The culinary tool of claim 4, wherein the tool member comprises a tang extending distally from the asymmetrical base region through the handle.

8. The culinary tool of claim 4, wherein the asymmetrical base region comprises a spatula portion base, wherein the curvilinear medial ridge begins at the spatula portion base and curves towards an interior portion of the tool member, wherein the curvilinear medial ridge has a length of between three and fifteen inches.

9. The culinary tool of claim 4, wherein the curvilinear medial ridge has a thickness of between forty-thousandths and sixty-thousandths of an inch.

10. The culinary tool of claim 4, wherein the cutting portion comprises a sharpened edge, wherein the cutting portion tapers from the curvilinear medial ridge to the sharpened edge along a cross section of the tool member in a linear fashion.

11. The culinary tool of claim 1, wherein the cutting portion comprises at least forty percent of the major face by area and the spatula portion comprises at least fifty percent of the major face by area.

12. The culinary tool of claim 1, wherein the asymmetrical base region comprises a cutting portion base and a spatula portion base, wherein the cutting portion base and the spatula portion base are different distances from the distal tip, wherein the handle is coupled to the tool member between the cutting portion base and the spatula portion base.

13. The culinary tool of claim 12, wherein the spatula portion comprises a blunt edge, wherein an angle defined by the spatula portion base and the blunt edge is between fifty and ninety degrees.

14. The culinary tool of claim 13, wherein the spatula portion comprises a convex curvature portion disposed opposite the blunt edge from the angle defined by the spatula portion base and the blunt edge.

15. The culinary tool of claim 14, wherein the handle comprises a first bolster section running in a curvilinear fashion from handle to the spatula portion base.

16. The culinary tool of claim 15, wherein the handle further comprises a second bolster section running from the handle to the cutting portion base.

17. The culinary tool of claim 1, wherein the cutting portion is substantially rectangular in shape and the spatula portion is substantially triangular in shape.

18. The culinary tool of claim 1, wherein the tool member is manufactured from one of carbon steel, Damascus steel, stainless steel, titanium, laminated metal, or plastic.

19. The culinary tool of claim 1, wherein the tool member comprises graphical indicia disposed along any of the cutting portion, the spatula portion, or combinations thereof.

* * * * *